United States Patent
Wang et al.

(10) Patent No.: US 10,871,615 B2
(45) Date of Patent: Dec. 22, 2020

(54) OPTICAL ADD/DROP MULTIPLEXER

(71) Applicant: Huawei Technologies Co., Ltd., Shenzhen (CN)

(72) Inventors: Jing Wang, Shenzhen (CN); Lei Liu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/715,958

(22) Filed: Dec. 16, 2019

(65) Prior Publication Data

US 2020/0116939 A1 Apr. 16, 2020

Related U.S. Application Data

(63) Continuation of application No. PCT/CN2017/088661, filed on Jun. 16, 2017.

(51) Int. Cl.
| | |
|---|---|
| G02B 6/293 | (2006.01) |
| G02B 6/036 | (2006.01) |
| G02B 6/124 | (2006.01) |
| G02B 6/122 | (2006.01) |
| G02B 6/12 | (2006.01) |

(52) U.S. Cl.
CPC ..... *G02B 6/29383* (2013.01); *G02B 6/03638* (2013.01); *G02B 6/29395* (2013.01)

(58) Field of Classification Search
CPC ............ G02B 6/29383; G02B 6/03638; G02B 6/29395; G02B 6/124; G02B 6/1228; G02B 6/12007; H04J 14/02
See application file for complete search history.

(56) References Cited

U.S. PATENT DOCUMENTS

| | | | |
|---|---|---|---|
| 5,696,859 A | 12/1997 | Onaka et al. | |
| 6,047,096 A | 4/2000 | Augustsson | |
| 6,501,872 B2 | 12/2002 | Augustsson | |
| 7,126,749 B2* | 10/2006 | Heim | H01S 5/5018 359/344 |
| 8,098,969 B2* | 1/2012 | Tolstikhin | H01S 5/5018 385/14 |
| 8,478,091 B2 | 7/2013 | Lu et al. | |
| 8,948,549 B2* | 2/2015 | Picard | G02B 6/2766 385/11 |
| 9,823,418 B2* | 11/2017 | Okayama | G02B 6/1228 |

(Continued)

FOREIGN PATENT DOCUMENTS

| | | |
|---|---|---|
| CN | 1249820 A | 4/2000 |
| CN | 1764096 A | 4/2006 |

(Continued)

OTHER PUBLICATIONS

Machine Translation and Abstract of Chinese Publication No. CN1764096, Apr. 26, 2006, 13 pages.

(Continued)

*Primary Examiner* — Ryan A Lepisto
(74) *Attorney, Agent, or Firm* — Conely Rose, P.C.

(57) ABSTRACT

An optical add/drop multiplexer (OADM) includes a drop signal separator and a drop signal reflector. The drop signal separator is coupled to a main input end and a drop end. The drop signal separator is coupled to the drop signal reflector, and the drop signal reflector is coupled to a main output end.

20 Claims, 5 Drawing Sheets

(56) References Cited

U.S. PATENT DOCUMENTS

| | | | |
|---|---|---|---|
| 9,989,702 B2 * | 6/2018 | Doany | G02B 6/2726 |
| 10,088,628 B1 * | 10/2018 | Oonawa | G02B 6/12004 |
| 10,228,512 B2 * | 3/2019 | Okayama | G02F 1/0147 |
| 2004/0033003 A1 | 2/2004 | Liu | |
| 2007/0081761 A1 | 4/2007 | Doerr et al. | |
| 2007/0133920 A1 | 6/2007 | Lee et al. | |
| 2007/0189669 A1 | 8/2007 | Tormen et al. | |
| 2008/0138008 A1 | 6/2008 | Tolstikhin et al. | |
| 2010/0322558 A1 | 12/2010 | Ogawa et al. | |

FOREIGN PATENT DOCUMENTS

| | | |
|---|---|---|
| CN | 1845484 A | 10/2006 |
| CN | 101278219 A | 10/2008 |
| CN | 101595410 A | 12/2009 |
| CN | 101672987 A | 3/2010 |
| CN | 101952753 A | 1/2011 |
| CN | 102879858 A | 1/2013 |
| CN | 103197387 A | 7/2013 |
| CN | 103217738 A | 7/2013 |
| CN | 105866893 A | 8/2016 |
| EP | 3287821 A1 | 2/2018 |
| JP | 2015121696 A | 7/2015 |
| JP | 2016024298 A | 2/2016 |
| WO | 2016179869 A1 | 11/2016 |

OTHER PUBLICATIONS

Machine Translation and Abstract of Chinese Publication No. CN1845484, Oct. 11, 2006, 9 pages.
Machine Translation and Abstract of Chinese Publication No. CN105866893, Aug. 17, 2016, 10 pages.

\* cited by examiner

OPTICAL ADD/DROP MULTIPLEXER

CROSS-REFERENCE TO RELATED APPLICATIONS

This application is a continuation application of International Patent Application No. PCT/CN2017/088661 filed on Jun. 16, 2017, which is hereby incorporated by reference in its entirety.

TECHNICAL FIELD

This application relates to the field of optoelectronic technologies, and in particular, to an optical add/drop multiplexer (OADM).

BACKGROUND

An OADM is an important filtering device in an optical network, and emergence of the OADM enables the optical network to evolve from a point-to-point network to a complex ring network. Implementation of diverse optoelectronic functional devices benefits from development of a silicon optical technology. The OADM based on the silicon optical technology mainly includes a microring and a fiber Bragg grating.

In a conventional OADM having a single fiber Bragg grating waveguide, as long as incident light meets a fiber Bragg grating condition, the incident light is reflected in the fiber Bragg grating waveguide, and leaves from an input port, thereby implementing a selective drop of a specific wavelength. To separate an input signal and a reflected signal, an external circulator or a Y branch structure usually needs to be used at the input port. The conventional OADM having a fiber Bragg grating waveguide mainly uses a reflection condition of the fiber Bragg grating in a lowest-order mode (for example, a 0-order mode). Bandwidth of a reflectance spectrum of the fiber Bragg grating is determined based on a coupling factor of a forward mode and a backward mode in the fiber Bragg grating waveguide. Three factors, namely a degree of similarity between the two modes, a grating size, and restriction of a waveguide on light, affect the coupling factor. When each of the three factors is relatively large, the coupling factor increases. In the other approaches, mainly Bragg reflection between a forward 0-order mode and a backward 0-order mode is used in the fiber Bragg grating waveguide, and the two modes have a relatively high similarity. Because light is restricted in the single fiber Bragg grating waveguide, the waveguide also has very strong restriction on light. Therefore, to implement a proper coupling factor requires a relatively small grating size, and usually the grating size is just tens of nanometers. Consequently, it is difficult to meet a process requirement of a complementary metal-oxide-semiconductor (CMOS) in the silicon optical technology, resulting in a great processing difficulty. Especially for dense wavelength division multiplexing (DWDM), a grating size is smaller.

SUMMARY

Embodiments of this application provide an OADM such that a fiber Bragg grating of a relatively large size is used, thereby reducing a processing difficulty.

To achieve the foregoing objective, the following technical solutions are used in the embodiments of this application.

According to a first aspect, an OADM is provided, and includes a drop signal separator and a drop signal reflector. The drop signal separator is connected to a main input end and a drop end. The drop signal separator is connected to the drop signal reflector, and the drop signal reflector is connected to a main output end, and an input end of the drop signal separator is configured to receive optical signals that are in a first mode, and transfer the optical signals that are in the first mode to the drop signal reflector in a single-layer waveguide transmission mode. The drop signal reflector includes a first transmission mode converter, a fiber Bragg grating waveguide, and a second transmission mode converter. The first transmission mode converter includes a first upper layer waveguide and a first lower layer waveguide, the first upper layer waveguide is located above the first lower layer waveguide, the first upper layer waveguide and the first lower layer waveguide are connected to the drop signal separator, and the first transmission mode converter is configured to convert, into a double-layer waveguide transmission mode, the single-layer waveguide transmission mode in which the drop signal separator sends the optical signals that are in the first mode. The fiber Bragg grating waveguide includes a second upper layer waveguide and a second lower layer waveguide, the second upper layer waveguide is located above the second lower layer waveguide, and the second lower layer waveguide is connected to the first lower layer waveguide, and a width of the second upper layer waveguide regularly changes with a first width alternating with a second width, to form a fiber Bragg grating, where the first width is greater than the second width, the second upper layer waveguide is connected to the first upper layer waveguide, and the fiber Bragg grating waveguide is configured to receive the optical signals that are in the first mode and that are sent by the first transmission mode converter, and reflect, to the first transmission mode converter as an optical signal that is in a second mode, an optical signal that has a predetermined wavelength and that is of the optical signals that are in the first mode, and is further configured to send, to the second transmission mode converter, another optical signal of the optical signals that are in the first mode except the optical signal having the predetermined wavelength. The second transmission mode converter includes a third upper layer waveguide and a third lower layer waveguide, the third upper layer waveguide is located above the third lower layer waveguide, two ends of the third upper layer waveguide are respectively connected to the second upper layer waveguide and the main output end, and the third lower layer waveguide is connected to the second lower layer waveguide, and the second transmission mode converter is configured to convert a transmission mode of the other optical signal into the single-layer waveguide transmission mode, and output the other optical signal using the main output end. The first transmission mode converter is further configured to convert the optical signal that is in the second mode into the single-layer waveguide transmission mode and output the optical signal to the drop signal separator, and the drop signal separator is further configured to output the optical signal that is in the second mode using the drop end. In the foregoing solution, the drop signal reflector includes a double-layer waveguide structure, and the double-layer waveguide structure reduces restriction on light. Therefore, the fiber Bragg grating can reduce coupling between incident signal light that is in the first mode and reflected signal light that is in the second mode. In this way, to achieve reflectance spectrum bandwidth same as that required in the other approaches, a larger grating size can be used, lowering a process requirement.

In an example, the drop signal separator includes a first waveguide and a second waveguide, an input end of the first waveguide and an output end of the second waveguide are on a same plane, and an output end of the first waveguide and an input end of the second waveguide are on a same plane, and a width of the first waveguide at the input end is equal to a width of the second waveguide at the output end, a width of the first waveguide linearly increases from the input end to the output end, a width of the second waveguide linearly decreases from the output end to the input end, the output end of the first waveguide is connected to the first upper layer waveguide and the first lower layer waveguide, the input end of the first waveguide is used as a main input end of the drop signal separator, and the output end of the second waveguide is used as a drop end of the drop signal separator. In this solution, the width of the first waveguide and the width of the second waveguide inversely change. Consequently, an index of refraction of the optical signal that is in the first mode by the first waveguide and an index of effective refraction of the optical signal that is in the second mode by the second waveguide cross each other. That is, at a location in the drop signal separator, the index of refraction of the optical signal that is in the first mode by the first waveguide is equal to the index of effective refraction of the optical signal that is in the second mode by the second waveguide. Therefore, the optical signal that is in the second mode can be output from the second waveguide, thereby reducing a loss of separating drop signals.

In addition, a width of an input end of the first upper layer waveguide is equal to a width of the output end of the first waveguide, and a width of the first upper layer waveguide is equal to the second width, and a width of an input end of the first lower layer waveguide is equal to the width of the output end of the first waveguide, a width of an output end of the first lower layer waveguide is greater than the first width, and a width of the first lower layer waveguide linearly increases from the input end to the output end.

In an example, a thickness of the first upper layer waveguide is greater than a thickness of the first lower layer waveguide.

In an example, a width of an input end of the second upper layer waveguide is equal to the second width, and a width of an output end of the second upper layer waveguide is equal to the second width, and a width of an input end of the second lower layer waveguide is equal to a width of an output end of the first lower layer waveguide, a width of an output end of the second lower layer waveguide is equal to the width of the output end of the first lower layer waveguide, and a width of the second lower layer waveguide is constant.

In an example, a thickness of the second upper layer waveguide is greater than a thickness of the second lower layer waveguide.

In an example, a width of an input end of the third upper layer waveguide is equal to the second width, and a width of the third upper layer waveguide linearly decreases from the input end to an output end, and a width of an input end of the third lower layer waveguide is equal to a width of an output end of the second lower layer waveguide, a width of an output end of the third lower layer waveguide is equal to a width of the output end of the third upper layer waveguide, and a width of the third lower layer waveguide linearly decreases from the input end to the output end.

In an example, a thickness of the third upper layer waveguide is greater than a thickness of the third lower layer waveguide.

In an example, the first upper layer waveguide, the second upper layer waveguide, and the third upper layer waveguide are identical in thickness, and the first lower layer waveguide, the second lower layer waveguide, and the third lower layer waveguide are identical in thickness.

In an example, the first mode is a 0-order mode, and the second mode is a 1-order mode, or the first mode is a 1-order mode, and the second mode is a 0-order mode.

BRIEF DESCRIPTION OF DRAWINGS

To describe the technical solutions in some of the embodiments of this application more clearly, the following briefly describes the accompanying drawings describing the embodiments.

DESCRIPTION OF EMBODIMENTS

The following describes the embodiments of this application with reference to accompanying drawings.

An OADM provided in the embodiments of this application is applied to an optical network that uses an optical fiber as a main transmission medium, such as a wide area network, a metropolitan area network, a newly established local area network with a large coverage. The OADM is mainly applied to a node that is in the optical network and that needs to upload and download a signal with a specific wavelength.

Figure 1:
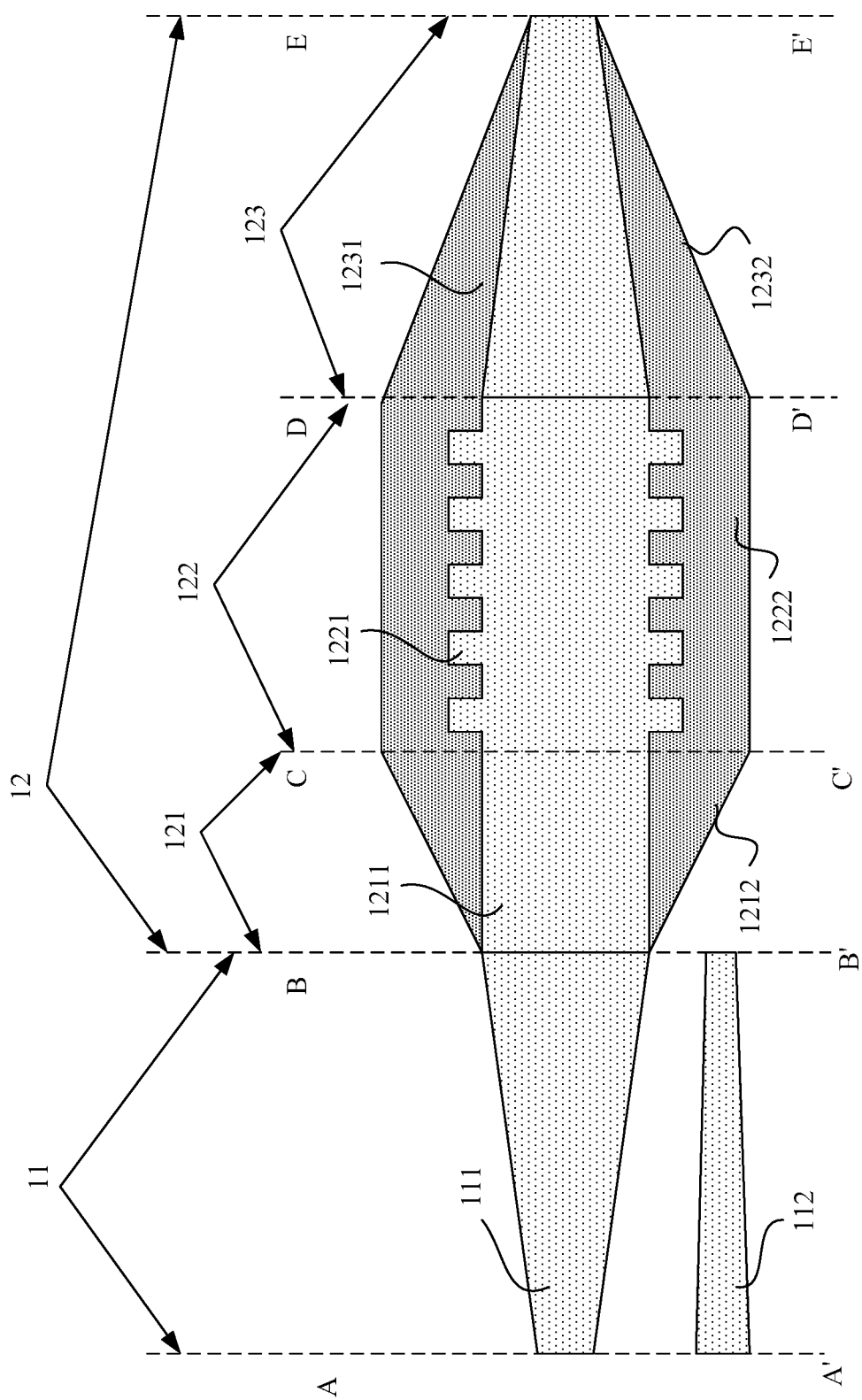
FIG. 1 is a schematic structural diagram of an OADM according to an embodiment of this application.
Figure 2:
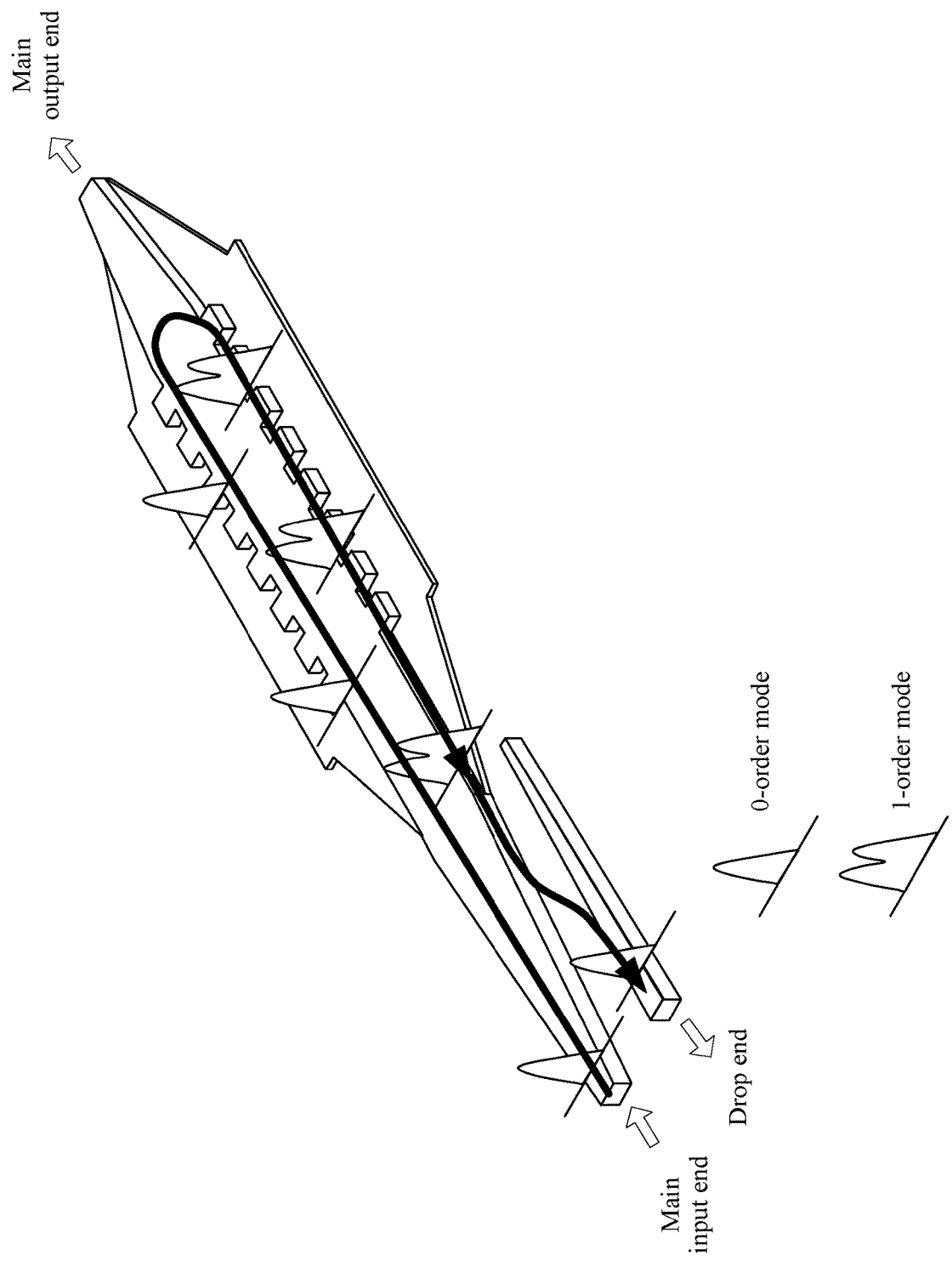
FIG. 2 is a schematic structural diagram of an OADM according to another embodiment of this application.

As shown in FIG. 1 and FIG. 2, an embodiment of this application provides an OADM, including a drop signal separator 11 and a drop signal reflector 12. The drop signal reflector 12 includes a first transmission mode converter 121, a fiber Bragg grating waveguide 122, and a second transmission mode converter 123. As shown in FIG. 1, a structure of the OADM is divided using dashed lines AA', BB', CC', DD', and EE'. The drop signal separator 11 is between AA' and BB'. The drop signal reflector 12 is between AA' and EE'. The first transmission mode converter 121 is between BB' and CC'. The fiber Bragg grating waveguide 122 is between CC' and DD'. The second transmission mode converter 123 is between DD' and EE'. As shown in FIG. 2, the drop signal separator 11 is connected to a main input end and a drop end. The drop signal separator 11 is connected to the drop signal reflector 12, and the drop signal reflector 12 is connected to a main output end. An input end of the drop signal separator 11 is configured to receive optical signals that are in a first mode, and transfer the optical signals that are in the first mode to the drop signal reflector 12 in a single-layer waveguide transmission mode. The drop signal reflector 12 is configured to reflect an optical signal that has a predetermined wavelength and that is of the optical signals that are in the first mode to the drop signal separator 11 in a second mode, and output the optical signal from the drop end. The drop signal reflector 12 is further configured to output, using the main output end, another optical signal of the optical signals that are in the first mode except the optical signal having the predetermined wavelength.

For example, the drop signal separator 11 includes a first waveguide 111 and a second waveguide 112. An input end of the first waveguide 111 and an output end of the second waveguide 112 are on a same plane, and an output end of the first waveguide 111 and an input end of the second waveguide 112 are on a same plane. A width of the first waveguide 111 at the input end is equal to a width of the second waveguide 112 at the output end, a width of the first waveguide 111 linearly increases from the input end to the output end, a width of the second waveguide 112 linearly decreases from the output end to the input end, the input end of the first waveguide 111 is used as a main input end of the drop signal separator 11, and the output end of the second waveguide 112 is used as a drop end of the drop signal separator 11. Herein, the drop signal separator 11 includes two waveguides that are placed in a signal propagation direction and whose widths inversely change. In the same direction, the width of the first waveguide 111 increases, and the width of the second waveguide 112 decreases. The two waveguides have a same width on an AA' plane, and both meet a single-mode waveguide condition in the silicon optical field. The two waveguides have a same length, and a spacing is relatively small such that optical coupling between predetermined modes can be met. The optical signals in the first mode from the outside first enters, from AA', a left-side port (that is, the main input end main input) of the first waveguide 111, and are propagated along the first waveguide 111. Because a modal refractive index for the input optical signal that is in the first mode increases as a waveguide width increases in a propagation process, the modal refractive index for the optical signal transmitted in the first waveguide 111 continuously increases. However, a modal refractive index of the adjacent second waveguide continuously decreases. Therefore, modal refractive indexes of the two waveguides are not equal at any propagation location of the two waveguides. That is, a phase matching condition of mode coupling is not met. Therefore, the input optical signal that is in the first mode directly passes the first waveguide 111, and is not coupled into the adjacent second waveguide 112. Eventually, the optical signal enters the drop signal reflector 12. In addition, because the first waveguide 111 is a strip-shaped waveguide, the optical signal in the first waveguide is transmitted in the single-layer waveguide transmission mode.

As shown in FIG. 1 and FIG. 2, the first transmission mode converter 121 includes a first upper layer waveguide 1211 and a first lower layer waveguide 1212. The first upper layer waveguide 1211 is located above the first lower layer waveguide 1212, and the first upper layer waveguide 1211 and the first lower layer waveguide 1212 are connected to the drop signal separator 11. The first transmission mode converter 121 is configured to convert, into a double-layer waveguide transmission mode, the single-layer waveguide transmission mode in which the drop signal separator 11 sends the optical signals that are in the first mode. Further, the first upper layer waveguide 1211 and the first lower layer waveguide 1212 are connected to the output end of the first waveguide 111.

For example, after the optical signal enters the drop signal reflector 12, the optical signal first passes the first transmission mode converter 121. The first transmission mode converter 121 is configured to convert the single-layer waveguide (the first waveguide 111) transmission mode of the optical signal into the double-layer (the first upper layer waveguide 1211 and the first lower layer waveguide 1212) transmission mode. A width of an input end of the first upper layer waveguide 1211 is equal to a width of the output end of the first waveguide 111. A waveguide width of the first upper layer waveguide 1211 remains constant. A width of an input end of the first lower layer waveguide 1212 is equal to the width of the output end of the first waveguide 111, and a width of the first lower layer waveguide 1212 linearly increases from the input end to an output end. In addition, a sum of a thickness of the first upper layer waveguide 1211 and a thickness of the first lower layer waveguide 1212 is equal to a thickness of the first waveguide 111. The first transmission mode converter 121 has a sufficient length. This ensures a very small loss in a mode conversion process, in which 0-order mode output is still kept for 0-order mode input, or 1-order mode output is still kept for 1-order mode input. Then the optical signal continues to enter the fiber Bragg grating waveguide 122.

The fiber Bragg grating waveguide 122 includes a second upper layer waveguide 1221 and a second lower layer waveguide 1222. The second upper layer waveguide 1221 is located above the second lower layer waveguide 1222, and the second lower layer waveguide 1222 is connected to the first lower layer waveguide 1212. A width of the second upper layer waveguide 1221 regularly changes with a first width alternating with a second width to form a fiber Bragg grating. The first width is greater than the second width, and the second upper layer waveguide 1221 is connected to the first upper layer waveguide 1211. The fiber Bragg grating waveguide 122 is configured to receive the optical signals that are in the first mode sent by the first transmission mode converter 121, and reflect, to the first transmission mode converter 121 as an optical signal that is in the second mode, an optical signal that has a predetermined wavelength and that is of the optical signals that are in the first mode, and is further configured to send, to the second transmission mode converter 123, another optical signal of the optical signals that are in the first mode except the optical signal having the predetermined wavelength.

A Bragg reflection condition of the fiber Bragg grating meets that an incident optical signal in the first mode is reflected in the second mode. The first mode is a 0-order mode ($TE_0$) and the second mode is a 1-order mode ($TE_1$), or the first mode is a 1-order mode, and the second mode is a 0-order mode. For example, a width of an input end of the second upper layer waveguide 1221 is equal to the second width, and a width of an output end of the second upper layer waveguide 1222 is equal to the second width. A width of a lower layer waveguide, namely the second lower layer waveguide 1222, of the fiber Bragg grating waveguide 122 is consistent with an end width of a lower layer waveguide, namely the first lower layer waveguide 1212, of the first transmission mode converter 121, a width of an upper layer waveguide, namely the second upper layer waveguide 1221, regularly changes, the smaller second width is the same as an end width of an upper layer waveguide, namely the first upper layer waveguide 1211, of the first transmission mode converter 121, the larger first width is less than the width of the second lower layer waveguide 1222, a width of an output end of the second lower layer waveguide 1222 is equal to a width of an output end of the first lower layer waveguide 1212, and the width of the second lower layer waveguide 1222 is constant, thereby forming the fiber Bragg grating. For example, if an optical signal of the main input end main input is in the 0-order mode, a larger first width size of the second upper layer waveguide 1221 and period selection can enable a forward 0-order mode and a backward 1-order mode to meet the Bragg reflection condition. That is, the optical signal that is input in the 0-order mode is reflected in the 1-order mode instead of passing the drop signal reflector 12. Bandwidth of a Bragg reflectance spectrum is determined based on a coupling factor of a forward mode and a backward mode in the fiber Bragg grating waveguide 122. Three factors, namely a degree of similarity between the two modes, a grating size, and restriction of a waveguide on light, affect the coupling factor. When each of the three factors is relatively large, the coupling factor increases. In the other approaches, mainly Bragg reflection between a forward 0-order mode and a backward 0-order mode is used in a fiber Bragg grating waveguide, and the two modes have a relatively high similarity. However, in reflection between the 0-order mode and the 1-order mode that is used in the present disclosure, the two modes have a very low similarity. In addition, the fiber Bragg grating waveguide uses a double-layer waveguide structure, and the second lower layer waveguide at a lower layer in the double-layer waveguide structure is relatively wide. That is, there is a relatively large waveguide portion having a high refractive index in the fiber Bragg grating waveguide. Restriction of the waveguide portion on light is relatively weak, thereby further reducing restriction of the waveguide on light. Therefore, when Bragg reflection having a same degree as that in the other approaches is considered, that is, when the coupling factors are the same, the other approaches requires a relatively small grating size, but this application requires a relatively large grating size such that a process requirement of a device is relatively low. In addition, based on a wavelength of signal light, processing of the optical signal by the fiber Bragg grating waveguide 122 includes two cases. In a first case, a wavelength of the optical signal meets a Bragg reflection condition, and the optical signal is reflected back to the first transmission mode converter 121. In a second case, a wavelength of the optical signal does not meet a Bragg reflection condition, and the optical signal is not reflected, but directly passes the fiber Bragg grating waveguide 122 and enters the second transmission mode converter 123.

As shown in FIG. 1 and FIG. 2, the second transmission mode converter 123 includes a third upper layer waveguide 1231 and a third lower layer waveguide 1232. The third upper layer waveguide 1231 is located above the third lower layer waveguide 1232, two ends of the third upper layer waveguide 1231 are respectively connected to the second upper layer waveguide 1221 and the main output end, and the third lower layer waveguide 1232 is connected to the second lower layer waveguide 1222. The second transmission mode converter 123 is configured to convert a transmission mode of the other optical signal into the single-layer waveguide transmission mode, and output the other optical signal using the main output end.

A width of an input end of the third upper layer waveguide 1231 is equal to the second width, and a width of the third upper layer waveguide 1231 linearly decreases from the input end to an output end. A width of an input end of the third lower layer waveguide 1232 is equal to the width of the output end of the second lower layer waveguide 1222, a width of an output end of the third lower layer waveguide 1232 is equal to a width of the output end of the third upper layer waveguide 1231, and a width of the third lower layer waveguide 1232 linearly decreases from the input end to the output end.

Figure 3:
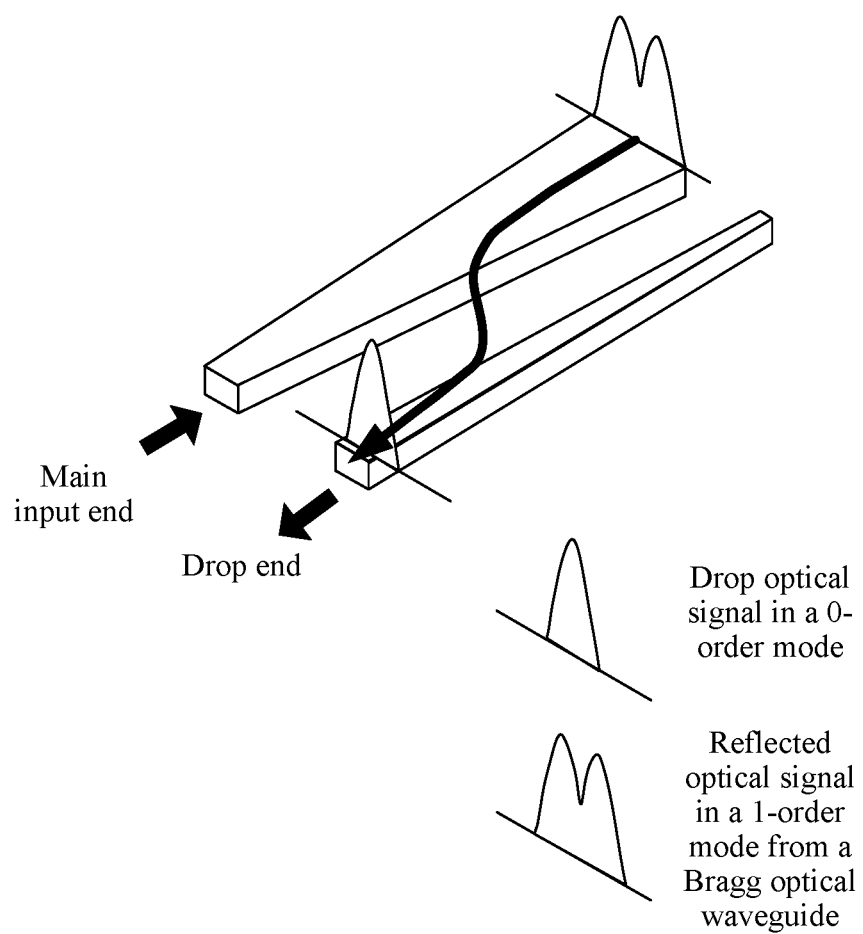
FIG. 3 is a schematic structural diagram of a drop signal separator according to an embodiment of this application.
Figure 4:
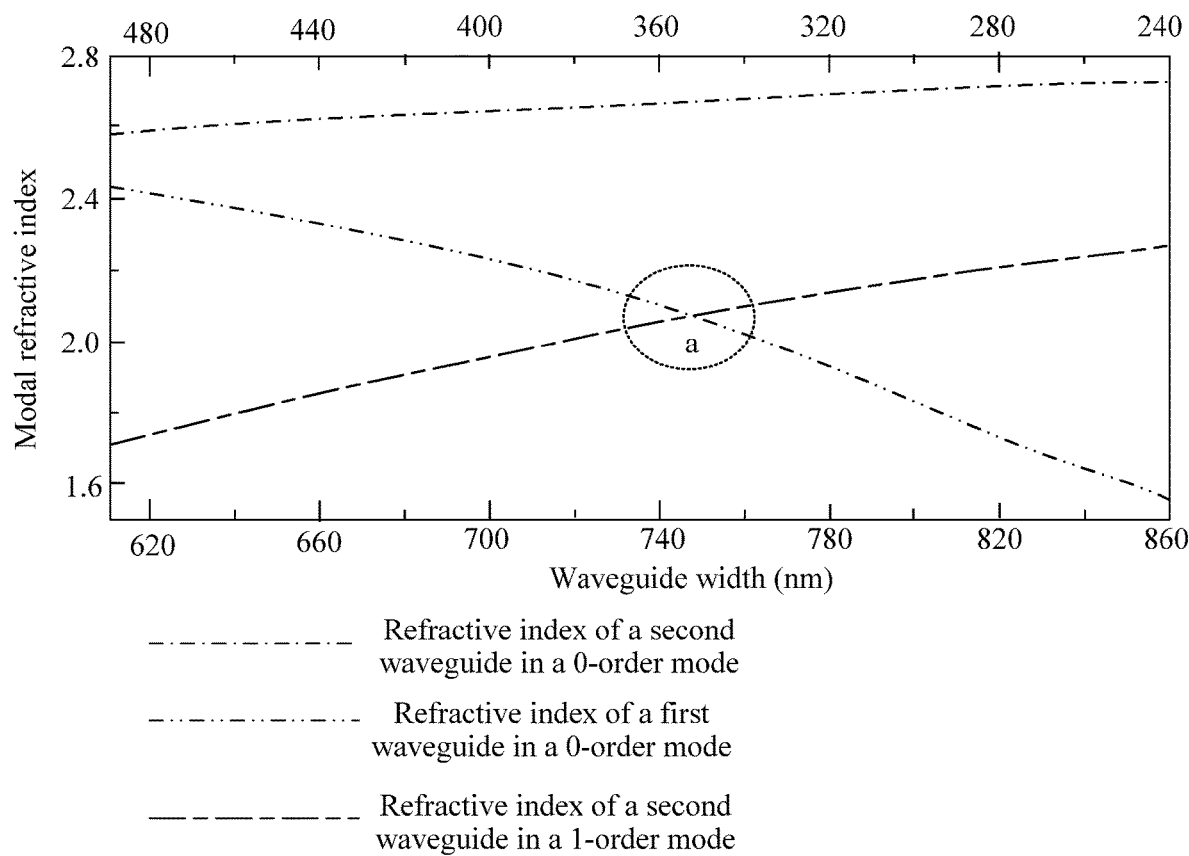
FIG. 4 is a schematic diagram of an index of refraction of an optical signal in each mode by each waveguide in a drop signal separator according to an embodiment of this application.
Figure 5:
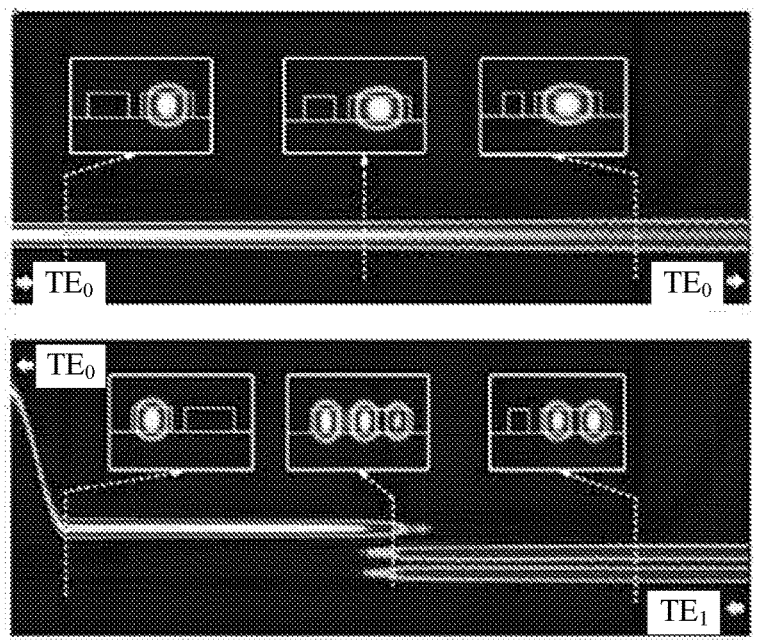
FIG. 5 is a schematic diagram of simulation of a flare of an optical signal in a drop signal separator according to an embodiment of this application.

Further, the first transmission mode converter 121 is further configured to convert the optical signal that is in the second mode into the single-layer waveguide transmission mode and output the optical signal to the drop signal separator 11, and the drop signal separator 11 is further configured to output the optical signal that is in the second mode using the drop end. Further, as shown in FIG. 3, FIG. 4, and FIG. 5, in the first case in which the fiber Bragg grating waveguide 122 processes the optical signal, that is, when a wavelength of signal light meets the Bragg reflection condition, the optical signal is reflected back to the first upper layer waveguide 1221 of the first transmission mode converter 121 in the 1-order mode. In this case, in a light propagation direction, a waveguide width of the first waveguide 111 decreases, and a width of the second waveguide 112 increases. However, with a same waveguide width, an effective refractive index in the 1-order mode is less than an effective refractive index in the 0-order mode. Therefore, at a location (for example, a location a shown in FIG. 4), an effective refractive index of the first waveguide 111 in the 1-order mode is the same as an effective refractive index of the second waveguide 112 in the 0-order mode. In short, a phase matching relationship is met. Therefore, the optical signal in the 1-order mode in the first waveguide 111 is slowly coupled into the 0-order mode for the second waveguide 112, and is eventually output from a left-side port (the drop end) of the second waveguide 112, to complete a drop function.

In the second case in which the fiber Bragg grating waveguide 122 processes the optical signal, that is, when a wavelength of the optical signal does not meet the Bragg reflection condition, the optical signal is not reflected, but directly passes the fiber Bragg grating waveguide 122 in the 0-order mode and enters the second transmission mode converter 123. The width of an upper layer waveguide, namely the third upper layer waveguide 1231, of the second transmission mode converter 123 decreases, and a maximum width value is the same as the width of the lower layer waveguide, namely the second lower layer waveguide 1222, of the fiber Bragg grating waveguide 122. The width of the third upper layer waveguide 1231 decreases, and a maximum width value is the same as a smaller value (the second width) of the width of the upper layer waveguide, namely the second upper layer waveguide 1221, of the fiber Bragg grating waveguide 122. The width of the output end of the third lower layer waveguide 1232 is equal to the width of the output end of the third upper layer waveguide 1231, and both waveguides meet a single-mode condition in a silicon photonics field. A role of the second transmission mode converter 123 is to convert the double-layer waveguide (the third upper layer waveguide 1231 and the third lower layer waveguide 1232) transmission mode of the optical signal into the single-layer waveguide transmission mode such that the optical signal is transmitted on an optical fiber connected to the main output end. The optical signal passing through the second transmission mode converter 123 is output from the main output end at EE'.

In addition, a thickness of the first upper layer waveguide is greater than a thickness of the first lower layer waveguide, a thickness of the second upper layer waveguide is greater than a thickness of the second lower layer waveguide, and a thickness of the third upper layer waveguide is greater than a thickness of the third lower layer waveguide. The first upper layer waveguide, the second upper layer waveguide, and the third upper layer waveguide are identical in thickness. The first lower layer waveguide, the second lower layer waveguide, and the third lower layer waveguide are identical in thickness.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. Some measures are recorded in dependent claims that are different from each other, but this does not mean that these measures cannot be combined to produce a better effect.

Although this application is described with reference to specific features and the embodiments thereof, various modifications and combinations may be made to them without departing from the spirit and scope of this application. Correspondingly, the specification and accompanying drawings are merely example descriptions of this application defined by the accompanying claims, and are considered as any one of or all modifications, variations, combinations, or equivalents that cover the scope of this application. A person skilled in the art can make various modifications and variations to this application without departing from the spirit and scope of this application. This application is intended to cover these modifications and variations provided that they fall within the scope of protection defined by the claims of this application and their equivalent technologies.

What is claimed is:

1. An optical add/drop multiplexer, comprising:
    a drop signal separator comprising a main input end and a drop end; and
    a drop signal reflector coupled to the drop signal separator and comprising:
        a main output end;
        a first transmission mode converter comprising:
            a first lower layer waveguide coupled to the drop signal separator; and
            a first upper layer waveguide located above the first lower layer waveguide and coupled to the drop signal separator;
        a fiber Bragg grating waveguide comprising:
            a second lower layer waveguide coupled to the first lower layer waveguide; and
            a second upper layer waveguide located above the second lower layer waveguide and coupled to the first upper layer waveguide, wherein a width of the second upper layer waveguide varies with a first width alternating with a second width to form a fiber Bragg grating, and wherein the first width is greater than the second width; and
        a second transmission mode converter comprising:
            a third lower layer waveguide coupled to the second lower layer waveguide; and
            a third upper layer waveguide located above the third lower layer waveguide, wherein a first end of the third upper layer waveguide is coupled to the second upper layer waveguide, and wherein a second end of the third upper layer waveguide is coupled to the main output end,
    wherein the main input is configured to:
        receive first optical signals that are in a first mode; and
        transfer the first optical signals to the drop signal reflector in a single-layer waveguide transmission mode,
    wherein the first transmission mode converter is configured to:
        receive the first optical signals from the drop signal separator; and
        convert the first optical signals in the single-layer waveguide transmission mode into a double-layer waveguide transmission mode,
    wherein the fiber Bragg grating waveguide is configured to:
        receive the first optical signals from the first transmission mode converter;
        reflect, to the first transmission mode converter, a first optical signal of the first optical signals as a second optical signal in a second mode and comprising a predetermined wavelength; and
        send, to the second transmission mode converter, a third optical signal of the first optical signals except the first optical signal,
    wherein the second transmission mode converter is configured to:
        convert a transmission mode of the third optical signal into the single-layer waveguide transmission mode; and
        output the third optical signal using the main output end,
    wherein the first transmission mode converter is further configured to:
        convert the second optical signal into the single-layer waveguide transmission mode; and
        output the second optical signal to the drop signal separator, and
    wherein the drop signal separator is further configured to output the second optical signal using the drop end.

2. The optical add/drop multiplexer of claim 1, wherein the drop signal separator comprises a first waveguide and a second waveguide, wherein a first input end of the first waveguide and a first output end of the second waveguide are on a first plane, wherein a second output end of the first waveguide and a second input end of the second waveguide are on a second plane, wherein a third width of the first waveguide at the first input end is equal to a fourth width of the second waveguide at the first output end, wherein a fifth width of the first waveguide linearly increases from the first input end to the second output end, wherein a sixth width of the second waveguide linearly decreases from the first output end to the second input end, wherein the second output end is coupled to the first upper layer waveguide and the first lower layer waveguide, wherein the first input end is the main input end, and wherein the first output end is the drop end.

3. The optical add/drop multiplexer of claim 2, wherein a seventh width of a third input end of the first upper layer waveguide is equal to an eighth width of the second output end, and wherein a ninth width of the first upper layer waveguide is equal to the second width.

4. The optical add/drop multiplexer of claim 3, wherein a tenth width of a fourth input end of the first lower layer waveguide is equal to the eighth width, wherein an eleventh width of a third output end of the first lower layer waveguide is greater than the first width, and wherein a twelfth width of the first lower layer waveguide linearly increases from the fourth input end to the third output end.

5. The optical add/drop multiplexer of claim 2, wherein the first waveguide has a first length.

6. The optical add/drop multiplexer of claim 5, wherein the second waveguide has a second length.

7. The optical add/drop multiplexer of claim 6, wherein the first length is equal to the second length.

8. The optical add/drop multiplexer of claim 2, wherein the first waveguide is a strip-shaped waveguide.

9. The optical add/drop multiplexer of claim 2, wherein modal refractive indexes of the first waveguide and the second waveguide are not equal.

10. The optical add/drop multiplexer of claim 1, wherein a thickness of the first upper layer waveguide is greater than a thickness of the first lower layer waveguide.

11. The optical add/drop multiplexer of claim 1, wherein a third width of a first input end of the second upper layer waveguide is equal to the second width, and wherein a fourth width of a first output end of the second upper layer waveguide is equal to the second width.

12. The optical add/drop multiplexer of claim 11, wherein a fifth width of a second input end of the second lower layer waveguide is equal to a sixth width of a second output end of the first lower layer waveguide, wherein a seventh width of a third output end of the second lower layer waveguide is equal to the sixth width, and wherein an eighth width of the second lower layer waveguide is constant.

13. The optical add/drop multiplexer of claim 1, wherein a thickness of the second upper layer waveguide is greater than a thickness of the second lower layer waveguide.

14. The optical add/drop multiplexer of claim 1, wherein a third width of a first input end of the third upper layer waveguide is equal to the second width, and wherein a fourth width of the third upper layer waveguide linearly decreases from the first input end to a first output end of the third upper layer waveguide.

15. The optical add/drop multiplexer of claim 14, wherein a fifth width of a second input end of the third lower layer waveguide is equal to a sixth width of a second output end of the second lower layer waveguide, wherein a seventh width of a third output end of the third lower layer waveguide is equal to an eighth width of the first output end, and wherein a ninth width of the third lower layer waveguide linearly decreases from the second input end to the third output end.

16. The optical add/drop multiplexer of claim 1, wherein a thickness of the third upper layer waveguide is greater than a thickness of the third lower layer waveguide.

17. The optical add/drop multiplexer of claim 1, wherein the first upper layer waveguide, the second upper layer waveguide, and the third upper layer waveguide have a same thickness.

18. The optical add/drop multiplexer of claim 1, wherein the first mode is a 0-order mode, and wherein the second mode is a 1-order mode.

19. The optical add/drop multiplexer of claim 1, wherein the first lower layer waveguide, the second lower layer waveguide, and the third lower layer waveguide have a same thickness.

20. The optical add/drop multiplexer of claim 1, wherein the first mode is a 1-order mode, and wherein the second mode is a 0-order mode.

* * * * *